Figure 1:
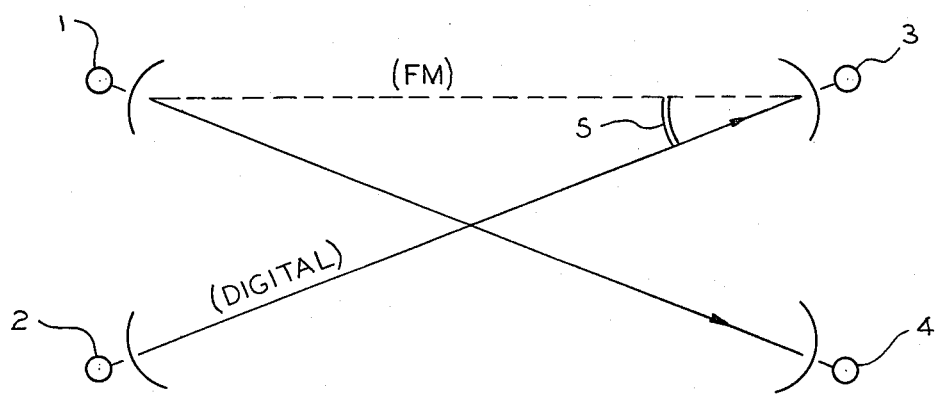

United States Patent [19]

Namiki

[11] 4,380,082
[45] Apr. 12, 1983

[54] DIGITAL SIGNAL RECEIVER WITH FM INTERFERENCE ELIMINATION CAPABILITY

[75] Inventor: Junji Namiki, Tokyo, Japan

[73] Assignee: Nippon Electric Co., Ltd., Tokyo, Japan

[21] Appl. No.: 257,234

[22] Filed: Apr. 24, 1981

[30] Foreign Application Priority Data

May 21, 1980 [JP] Japan .................................. 55-67593
May 21, 1980 [JP] Japan .................................. 55-67594

[51] Int. Cl.$^3$ ............................................. H04L 1/00
[52] U.S. Cl. .................................... 375/102; 371/41; 455/206; 455/305
[58] Field of Search .................... 371/2, 30, 37, 41, 72; 328/162, 164, 165; 375/58, 99, 101, 102; 455/63, 65, 296, 303, 305, 312, 206

[56] References Cited

U.S. PATENT DOCUMENTS 3,422,222  1/1969  Lord ..................................... 375/58
3,537,008 10/1970  Lakatos .............................. 455/65
3,613,077 10/1971  Forney, Jr. ......................... 371/30

Primary Examiner—Benedict V. Safourek
Attorney, Agent, or Firm—Laff, Whitesel, Conte & Saret

[57] ABSTRACT

The invention eliminates an FM interference from a digital signal when the interference occurs because the FM and digital signals are transmitted over adjacent routes and sharing a common frequency band. An error detector finds a difference between a detected baseband digital signal and an assumed transmission code, which is taken from the baseband signal. The detector produces a first error signal responsive thereto. A phase synchronizing circuit produces an output signal synchronized with the first error signal. A coefficient circuit multiplies the output of the synchronizing circuit by a complex coefficient which is then subtracted from the baseband signal. A second error detector produces a second error signal responsive to the difference between the output of the subtractor and a discriminated transmission code. Responsive thereto to a control circuit varies the complex coefficient to produce an output which is the original baseband signal, free of the FM interference.

9 Claims, 4 Drawing Figures

DIGITAL SIGNAL RECEIVER WITH FM INTERFERENCE ELIMINATION CAPABILITY

The present invention relates to receivers for digital radio communication and, more particularly, to digital signal receivers capable of eliminating interference from frequency modulation (FM) channels using the same frequency band.

Analog radio transmission in the microwave region has conventionally used FM signals. Recently, digital radio transmission has also come to be used in the same frequency region. The International Radio Consultative Committee (CCIR) has recommended particular the frequency allocations for FM to enable the coexistence of the digital and analog (communications) systems.

However, such a digital system, based on multi-phase and multi-amplitude modulation, is vulnerable to interference from other systems. The transmission spectra of these other systems tend to have strong carrier components, especially because the modulation factor is extremely low in currently used FM systems, in order to increase the number of available transmission channels per unit frequency band. Consequently, such FM systems cause interference in digital systems which may share the same frequency band and which may rely on a branching angle which is different from the angle of the FM system. A branching angle is an angle between the antenna transmission direction and the incidence transmission direction of the interfering wave from the FM system.

To overcome such interference, each digital system is required to transmit a signal with greater power than would otherwise be required. Consequently, the entire system becomes expensive and unreliable, especially due to the use of particular improved or added devices, such as a powerful transmitter, and other components, which may be used for achieving such an increased power.

Some problems of coexistent FM and digital systems are discussed in a paper by M. Ramadan et al., entitled "Interference Effects of Digital Radios into Adjacent Channel Analog Radios," *CONFERENCE RECORD OF INTERNATIONAL CONFERENCE ON COMMUNICATIONS*, Volume 1 of 3, published June 8–12, 1980, pp. 34.3.1–34.3.5, and in a paper by K. L. Seastrand Jr., entitled "Coexistence of High Speed Digital and Broadband Analog Radio Systems," *PROCEEDINGS OF THE INTERNATIONAL ZURICH SEMINAR ON DIGITAL COMMUNICATIONS*, published Mar. 4–6, 1980, pp. B6.1–B6.5.

Therefore, one object of the present invention is to provide a simplified receiver for digital radio communication to eliminate such interference without imposing restrictions on the transmitter.

According to the invention, a receiver is provided for digital radio communication to eliminate the FM interference from at least one adjacent route using the same carrier frequency band.

Figure 2:
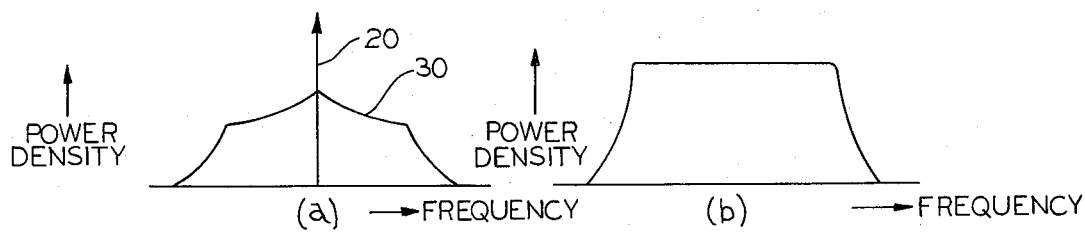
Figure 3:
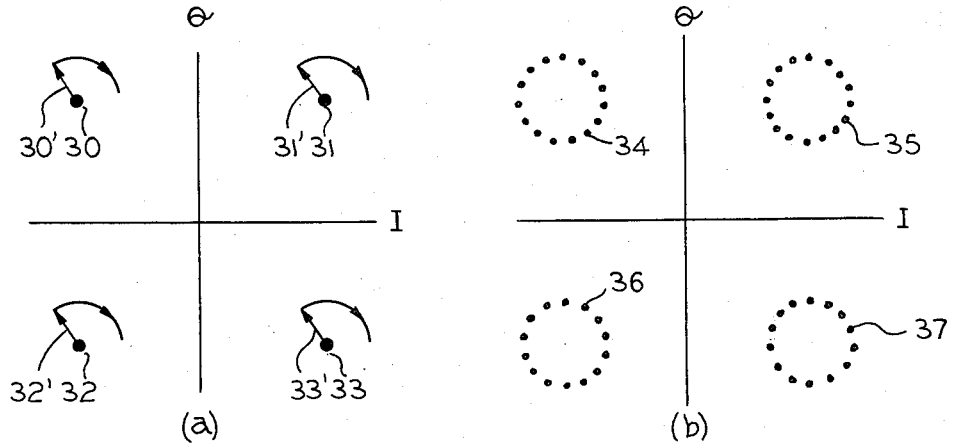
Figure 4:
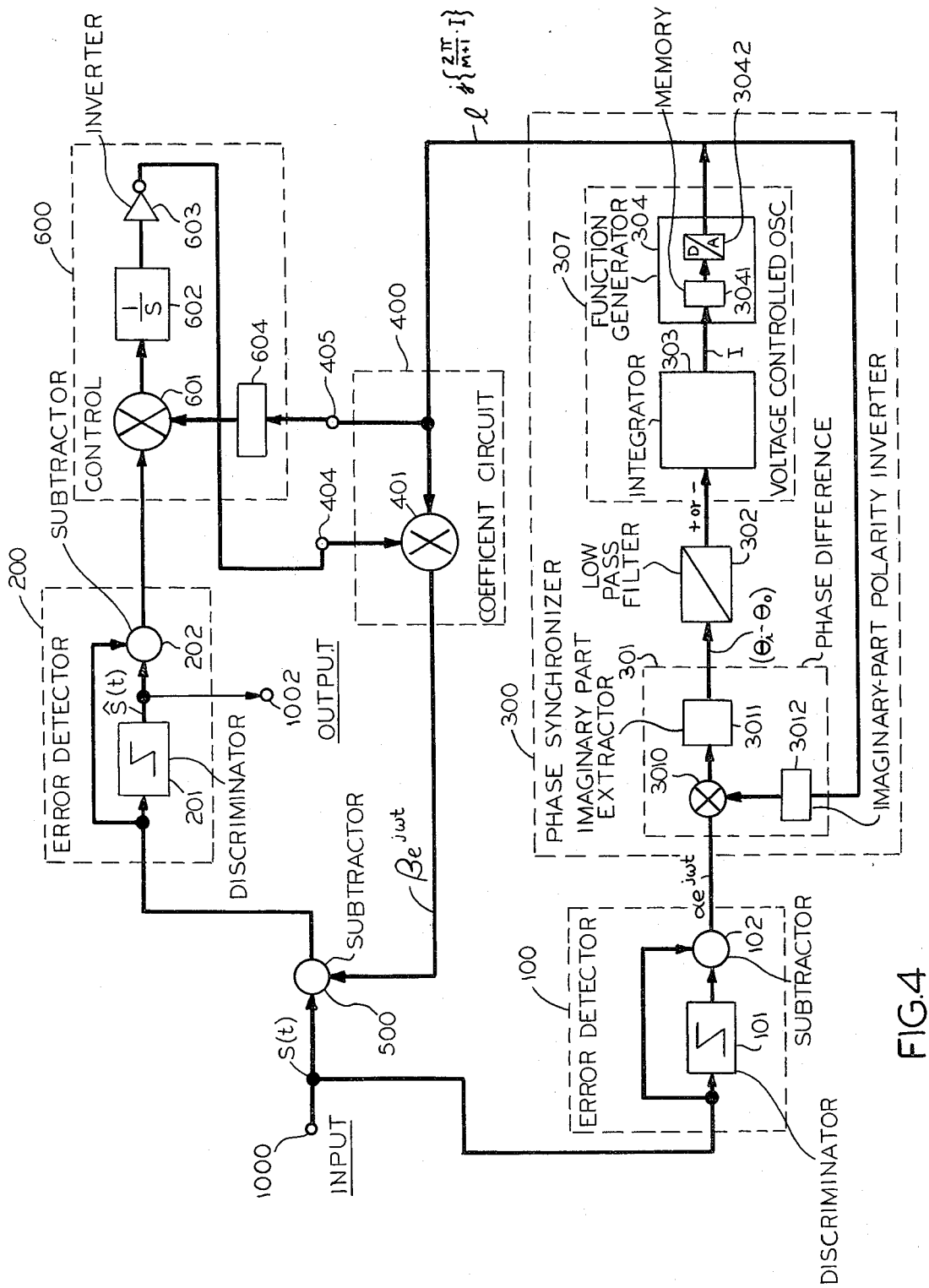

The inventive receiver comprises a first error detector for obtaining the difference between a detected baseband signal and a transmission code discriminated from the baseband signal. A phase synchronizing circuit produces an output which is synchronized in phase with the output of the first error detector. A coefficient circuit multiplies the output of the synchronizing circuit by a complex coefficient. A subtractor subtracts the output of the coefficient circuit from the baseband signal. A second error detector responds to the output of the subtractor, which reflects the difference between the output of the subtractor and the transmission code. From the output of the subtractor, a control circuit obtains the baseband signal, free of the FM interference. This freedom from interference is achieved by varying the complex coefficient of the coefficient circuit, based on a correlation between the output of the second error detector and the output of the synchronizing circuit. Other features of the present invention will become more apparent from the following detailed description, taken in conjunction with the accompanying drawings, wherein:

FIG. 1 is a diagram showing an exemplary four antennas and three transmission paths for describing the interference from an FM channel operating on an adjacent route;

FIGS. 2(a) and (b) are diagrams for describing the transmission spectra of an FM signal and a digital signal;

FIGS. 3(a) and (b) are diagrams for describing the arrangements of signal points when a four-phase, phase-modulated (4-PM) wave, used for digital transmission, is affected by the interference; and FIG. 4 is a block diagram of one embodiment of the present invention.

FIG. 1 shows each route of an exemplary FM channel, plus a digital channel sharing the same frequency band. One FM channel uses the route from antenna 1 to antenna 4, while a digital channel uses the route from antenna 2 to antenna 3. The interfering FM signal (a dashed line) from the antenna 1 is also received at the antenna 3, at a branching angle 5. This signal becomes an interference component passing from the FM channel into the digital channel.

In FIG. 2(a), the transmission spectrum of the FM channel contains a strong carrier component. This phenomenon is found in a high-efficiency digital system such as the System "SF-U$_4$", with an extremely low modulation factor. System "SF-U$_4$" has been operated commercially since 1977, by the Nippon Telegraph and Telephone Public Corporation, to transmit 2,700 channels in the 29.65 MHz band. The FM signal has a strong line spectrum 20 corresponding to a carrier component. The remaining continuous spectrum 30 represents speech information which has such a small power density, that it is negligible as compared with the density of spectrum 20. As a result, the interference component passing from the FM channel, to the digital channel sharing the same frequency band, appears as a direct current (dc) offset with respect to a zero level in the coherently detected baseband.

FIG. 2(b) shows the transmission spectrum of the digital channel, which usually contains no interference component, but which does contain only a digital signal component.

As is apparent from FIGS. 2(a) and 2(b), in response to the coherent detection of a received digital signal, the carrier component contained in the spectrum of the FM signal is coherently detected in the same frequency band. The interference occurs in the vicinity of the zero frequency of the digital signal component which is so detected.

In FIG. 3(a), reference numerals 30, 31, 34 and 33 represent the 4-PM digital reception signal points on the orthogonal phase (IQ) plane. (For details of such a signal point arrangement on the IQ plane, reference may be made to page 233 of "DATA TRANSMISSION" by William R. Bennett and James R. Davey, published in 1965 by McGraw-Hill Inc.) If interference affects these signal points, the interference components 30', 31', 32' and 33' are superimposed on the reception signal points, so that the components turn around the corresponding regular signal points, at a beat frequency which is equal to the difference between the carrier frequencies of the FM and digital channels.

As shown in FIG. 3(b), values 34, 35, 36, and 37 are each dispersed in a circular pattern, resulting from the successive sampling of the waveforms shown in FIG. 3(a). A detection of transmission codes results from these samples.

In FIG. 4, an embodiment comprises error detectors 100 and 200, a phase synchronizing circuit 300, a coefficient circuit 400, a subtractor 500, and a control circuit 600. Thick lines in the drawing represent complex signal paths.

A received signal is coherently detected and sampled, at a predetermined sampling frequency, by a conventional demodulator (not shown) which is provided in the circuit leading to an input terminal 1000. (For details of such a demodulator, reference may be made to pages 72–73 of "PRINCIPLES OF DIGITAL COMMUNICATION AND CODING," by Andrew J. Viterbi et al., published in 1979 by McGraw-Hill, Inc.)

A discriminator 101 of the detector 100 performs the discrimination of each transmission code included in the coherently detected digital, baseband signal received at the terminal 1000. A subtractor 102 provides a signal representing the difference between the digital baseband signal and the output of the discriminator 101. In the presence of such an FM interference, the detector 100 extracts the interference as the output of the subtractor 102.

The circuit 300 includes a phase difference detector 301, a low-pass filter 302, and a voltage-controlled oscillator (VCO) 307. The output of oscillator 307 is synchronized in phase with the output of the detector 100. The VCO 307 further includes an integrator 303 and a function generator 304.

The integrator 303 takes only the values ranging from 0 to $2\pi$ with an integrating operation of modulo ($2\pi$). The integrator 303 may be composed of an up-down counter. The content of the up-down counter is increased or decreased depending on whether the output of the filter 302 (that is, the average of the output of the detector 301) is positive or negative. Immediately after the counter overflows when its content exceeds its maximum value M ($2\pi = 360$), it returns to zero, indicating that it may function as an integrator of modulo ($2\pi$) or, modulo M.

The function generator 304 produces exp $\{j\theta_s\}$ (exp $\{j\theta_s\} = \cos\theta_s + j\sin\theta_s$) response to the output $\theta_s$ of the integrator. The function generator 304 is made up of a combination memory 3041 and a digital-analog (D/A) converter 3042. The memory uses the output $\theta_s$ of the counter, as its address. Converter 3042 converts the digitized output ($\cos\theta_s + j\sin\theta_s$) of this memory into an analog form. In this case, the generator 304 responds to an address "I" (varying from 0 to M), and produces a complex output $$e^{\{j\frac{2\pi}{M+1} \cdot I\}}$$

The detector 301 comprises a multiplier 3010, an imaginary-part polarity inverting circuit 3012 for producing a complex conjugate value, and an imaginary-part extracting circuit 3011 for giving an imaginary part alone, which appears as the output of circuit 301. The detector 301 is designed to provide the phase difference $\theta_e$ between an input signal $e^{j(\omega t + \theta_i)}$ and the output $e^{j(\omega t + \theta_o)}$ of the VCO 307 in the form of $I_m\{e^{j(\omega t + \theta_i)} \cdot e^{-j(\omega t + \theta_o)}\} = I_m\{e^{j(\theta_i - \theta_o)}\} = \sin(\theta_i - \theta_o) \div \theta_i - \theta_o$. The multiplier 3010 receives the input signal $e^{j(\omega t + \theta_i)}$ from error detector 100 and the complex conjugate of the output $e^{j(\omega t + \theta_o)}$ of the VCO 307 from the inverter circuit 3012. The output of the multiplier 3010 is given by the formula $e^{j(\omega + \theta_i)} \cdot e^{-j(\omega + \theta_o)} = e^{j(\theta_i + \theta_o)}$.

Consequently, the circuit 3011 produces a signal representing the phase difference between the phase of the output of the VCO 307 and the phase of the input signal from the error detector 100, as follows: $I_m\{e^{j(\theta_i + \theta_o)}\} = -\sin(\theta_i - \theta_o) = \theta_i - \theta_o$.

The coefficient circuit 400 includes a multiplier 401, a terminal 404 for supplying a complex coefficient to the multiplier 401, and another terminal 405 for observing the complex value given to the multiplier from the circuit 300.

The subtractor 500 subtracts the output of the coefficient circuit 400 from the coherently detected baseband signal received at the terminal 1000.

Next, the interference eliminating operation of the invention will be described in detail. Error detector 100 detects interference components from the FM channel which appear in the input signal. At the next stage, the circuit 300 synchronizes the interference components and feeds them, as a sine wave, to the coefficient circuit 400. The complex value fed to the terminal 404 is diversely varied so that the coefficient circuit 400 produces a sine wave having the same amplitude and the same phase as the interference which occurs responsive to the FM channel. The subtractor 500 subtracts this sine wave from the input signal so that the next stage receives a signal with an elimination of the interference involved in the input signal.

The error detector 200 has the same structure as the error detector 100 including a discriminator 201 and a subtractor 202. The output of the discriminator 201 is from a terminal 1002 as the receiver decision result.

The control circuit 600 responds either to the direction between the output of the detector 200 and the output from the terminal 405 or to the complex output of the circuit 400. Circuit 600 comprises a multiplier 601, an integrator 602, and an imaginary-part polarity inverting circuit 604 for generating a complex conjugate value. The output of the circuit 600 is supplied to the input terminal 404 of the coefficient circuit 400 by way of the inverter circuit 603.

Next, the operation of the control circuit 600 will be described in greater detail. It is assumed that the transmission code, the output of the discriminator 201, the interference from the FM channel, and the output of the circuit 400 (or the input signal to the subtractor 500), are represented by S(t), S(t), $\alpha e^{j\omega t}$, and $\beta e^{j\omega t}$, where $\alpha$ and $\beta$ are complex coefficients and S(t) becomes almost equal to S(t) in the normal state. The input to the control circuit 600 is $S(t) + \alpha e^{j\omega t} - S(t) - \beta e^{j\omega t} = e^{j\omega t}(\alpha - \beta)$, and the output of the integrator 602 is $E\{e^{j\omega t}(\alpha - \beta) \cdot e^{-j\omega t}\} = E\{\alpha - \beta\} = \alpha - \beta$.

In the foregoing equations, ($\alpha - \beta$) represents the difference between the output of the detector 100 and the output of the phase synchronizer circuit 300. As in the operation of a conventional feedback control system ($\alpha - \beta$) can be reduced to zero by inverting the polarity of the difference and feeding it back to combine with or control the input signal. The output terminal 1002 is used to supply the discrimination result of the transmission code.

Thus, the circuit 600 feeds the terminal 4040 of the circuit 400 with the most suitable complex coefficient for eliminating the FM interference. Also, in FIG. 4, the discriminator 101 of the error detector 100 can be eliminated. Instead the output of the discriminator 201 of the error detector 200 can be used. Conversely, the output of the discriminator 101 can be used if the discriminator 201 is omitted.

Incidentally, the multiplier 401, the discriminator 201, the subtractors 500, 102, and 202, and the multiplier 3010 may include the circuits and be the devices described in The Semiconductor Data Library, Volume 6/Series B, 1975, Motorola Inc., pp. 8–75, 6–5, 3–128, and 8–141, respectively. Further, the up-down counter 303 may include the circuit, and be the devices in The Semiconductor Data Library, Volume 4/Series A, 1974, Motorola Inc., page 3–101.

Those who are skilled in the art will readily perceive how to modify the system. Therefore, the appended claims are to be construed to cover all equivalent structures which fall within the true scope and spirit of the invention.

The invention claimed is:

1. A digital signal receiver for eliminating FM interference in a received digital baseband signal, which appears on at least one adjacent route sharing the same frequency band, said receiver comprising first error detector means responsive to the received baseband signal for giving an error signal representing a difference between said baseband signal and a discriminated transmission code; phase synchronizing means responsive to said first error detector means for producing an output signal which is synchronized with a complex value output of the first error detector means; coefficient circuit means responsive to said phase synchronizing means for multiplying the output of the synchronizing means by a complex coefficient; subtractor means responsive to said coefficient circuit means for subtracting the output of the coefficient circuit from said baseband signal; second error detector means responsive to said subtractor means for giving a second error signal representing the difference between the output of said subtractor means and a transmission code discriminated from the output of the subtractor; and a control circuit means for varying the complex coefficient of the coefficient circuit means based on the correlation between the output of the second error detector means and the output of the synchronizing means.

2. A digital signal receiver comprising error detector means for generating an error signal based upon detected differences between discriminated transmission codes and received digital baseband signals, synchronizing means responsive to said error signal for synchronizing said error signal with a complex value correcting signal, means for multiplying the output signal of said synchronizing means with a predetermined coefficient signal, subtracting means for extracting said multiplied correcting signal from said digital signal, and control means responsive to said subtracting means for adjusting said coefficient to produce an interference free digital signal.

3. The receiver of claim 2 wherein said error detector means comprises a discriminator means and a subtractor means, and means for applying said received digital signal both directly to said subtractor means and through said discriminator means to said subtractor means, the output of said subtractor representing the difference between said directly applied signal and the output of said discriminator.

4. The receiver of claim 2 wherein said synchronizing means comprises a voltage controlled oscillator, and phase difference detection means for controlling said voltage controlled oscillator responsive to a combination of said error signal and an output of said voltage controlled oscillator fed back to said phase difference detection means.

5. The receiver of claim 4 and means responsive to said phase difference responsive means for extracting a part of said combination signal before it is applied to said voltage controlled correcting means.

6. The receiver of either the claims 4 or 5 and means for applying the output of said voltage controlled oscillator to said coefficient multiplier means, thereby producing said multiplied correcting signal.

7. The receiver of claim 6 and second discriminator means, second subtractor means, said control means comprising means for applying the output of said subtracting means directly to said second subtractor means and through said second discriminator means to said second subtractor means.

8. The receiver of claim 7 and means for integrating the output of said second subtractor means and means responsive to an inversion of the output of said second subtractor means for making said adjustment of said coefficient.

9. A process for eliminating an FM interference in a received digital baseband signal, said process comprising the steps of:
 (a) detecting a difference between the received signal and an anticipated signal;
 (b) synchronizing the detected difference with a complex output signal;
 (c) multiplying the synchronized signal by a coefficient signal;
 (d) combining the multiplied signal with the received signal;
 (e) sampling said combined signal; and
 (f) adjusting said coefficient as a function of said sampled combined signal.

* * * * *